Patented Aug. 26, 1941

2,253,955

UNITED STATES PATENT OFFICE 2,253,955

MAGNESIA COATED REFRACTORY PARTICLES AND THE PREPARATION THEREOF

Gustav A. Hebbe and Ralph E. Gibbs, York, Pa., assignors to J. E. Baker Company, York, Pa., a corporation of Pennsylvania No Drawing. Application July 14, 1938, Serial No. 219,195

12 Claims. (Cl. 106—61)

This invention relates to refractory material comprising coated particles having improved refractory properties and to the preparation thereof. Relatively large quantities of dolomite and dolomitic limestone, i. e. carbonate minerals containing a combination of calcium carbonate and magnesium carbonate, with the proportion of magnesia varying from about 10 to 80% with respect to the lime, are used in the linings of various metallurgical furnaces. The natural mineral, at least that available in large quantities, is usually rather poor in magnesia and, consequently, is not as refractory as is desirable.

In the preparation of particles of such material for lining metallurgical furnaces, the natural mineral or stone is crushed and screened to a suitable maximum size. This raw material is then introduced into a kiln or furnace and heated to dead or hard burn and shrink the particles of the raw mineral. The usual dead burned dolomite or dolomitic limestone contains about 30–40% of magnesia.

One object of our invention is to provide a new refractory material comprising a core of dead or hard burned dolomite or dolomitic limestone coated with a ceramically bonded layer substantially higher in magnesia than the core.

Another object of this invention is to provide an economical method of producing such refractory particles.

We prefer to prepare the refractory material of our invention by performing the coating operation simultaneously with the dead burning of the raw dolomite or dolomitic limestone employed, although, if desired the burned and shrunk dolomitic particles may be coated by a separate treatment after burning. In accordance with our preferred practice, a charge of suitably sized, crushed raw dolomite or dolomitic limestone is introduced into a rotary kiln. Finely divided, relatively pure magnesia or magnesium compound may be mixed with the raw stone or may be introduced into the kiln separately. In addition, a small proportion up to about 8% of the total charge for the kiln should consist of a suitable finely divided bonding or cementing agent. Various readily fusible inorganic materials may be employed for this purpose, such as iron oxides, alumina, cinder, slag or various fire clays.

As this mixture of stone particles, magnesium compound and bonding agent travels through the rotary kiln, it is preferably heated to a maximum temperature of the order of about 3000° F. and the stone is calcined. The material moving through the kiln gradually reaches this temperature and the fusible bonding agent fixes the finer particles of magnesia as coatings on the surfaces of the dolomitic particles. The coated refractory as it comes from the kiln may be cooled and screened or sized in any suitable manner, and will be found to consist substantially of particles having cores of dead burned dolomite or dolomitic limestone encased within layers having a magnesia content considerably higher than the cores.

In view of the finely divided dust-like character and light weight of the magnesia, we prefer to introduce this constituent, either alone or mixed with the other materials, in the form of a slurry. This prevents considerable quantities of the magnesia from being carried out of the kiln to the stack. A slurry may be formed by mixing the raw mineral or stone with the magnesia or magnesium compound and bonding agent in the desired proportions and moistening this mixture. Water is a convenient liquid for use in forming such a slurry, and should be used in quantities giving the charge the desired consistency as will be understood by those skilled in the art.

The proportion of magnesia, or magnesium compound employed should be less than the weight of the raw stone in the charge, and may vary depending upon the thickness and magnesia content of the coatings to be obtained. When using magnesia, we prefer to employ about 10 to 50% of magnesia in the charge based on the total weight of the charge. If some other magnesium compound is employed, a proportion equivalent to 10 to 50% of magnesia should be used.

In order to facilitate the coating operation, an aqueous solution of some electrolyte solute capable of acting as a bonding or fluxing agent may be employed advantageously in forming the slurry instead of merely using water for this purpose. Numerous readily fusible inorganic salts that are soluble in water such as sodium chloride, borax, or magnesium chloride may be thus employed, either singly or in combination.

A typical charge for a rotary kiln which may be used is as follows:

| | Per cent by weight |
|---|---|
| Magnesium oxide | 20 |
| Sized dolomite | 50 |
| Iron oxide | 5 |
| Sodium chloride | 2 |
| Water | 23 |
| Total | 100 |

The coated refractory particles of our invention closely approach magnesite in their properties. The coating serves to protect the burned dolomite core of the particles from deterioration by the atmosphere due to a tendency to slake. The coated particles also have a higher fusing temperature and when used with a bonding material in making a furnace lining are considerably more refractory and stable than dolomite, It is important in preparing our new coated refractory particles to employ some form of a relatively fusible flux or bonding agent, although such agent may be selected from a wide variety of materials. For economic reasons however, bonding such as iron oxides or mill scale are preferred.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of preparing coated refractory particles comprising heating and agitating burned dolomitic particles mixed with a minor proportion of a finely divided relatively pure magnesium compound and a bonding agent therefor to ceramically bond magnesia to the surfaces of said dolomitic particles and thereby increase the magnesia content of the surfaces of said particles.

2. A process of preparing coated refractory particles comprising burning and agitating a mixture containing principally dolomitic mineral particles, a minor proportion of finely divided relatively pure magnesium compound, and a smaller proportion of an inorganic bonding agent to shrink and coat said dolomitic particles and thereby increase the magnesia content of the surfaces of said particles.

3. A process of preparing refractory material comprising dead burning dolomite particles ranging in size from dust to not substantially larger than ⅝ inches in the presence of a minor proportion of finely divided relatively pure magnesia, and a small amount up to about 8% of an inorganic relatively fusible bonding agent.

4. A process of preparing refractory particles comprising forming a slurry containing a major proportion of dolomite particles, a minor proportion of a relatively pure magnesium compound, and a smaller proportion of a bonding agent, introducing said slurry into a rotary kiln and heating said slurry to a temperature of at least about 3000° F.

5. A process of preparing refractory particles comprising forming a slurry containing a major proportion of dolomite particles, a minor proportion of a relatively pure finely divided magnesia, and about ½ to 8% of a bonding agent, introducing said slurry into a rotary kiln and heating said slurry to a temperature of at least about 3000° F.

6. A process of making coated refractory particles comprising dead burning dolomite particles of such a size as will pass through a 12 mesh screen together with about 20 to 50% by weight of relatively pure magnesia, and about 1 to 8% by weight of a bonding agent to increase the magnesia content of the surfaces of said particles.

7. A process of preparing coated refractory particles comprising introducing into a rotary kiln a charge comprising principally crushed, sized particles of a dolomitic stone, a minor proportion of finely divided magnesia moistened with water to form a slurry, and a smaller but substantial proportion of a relatively fusible bonding agent, and heating said charge in the kiln to a maximum temperature of at least about 3000° F. to substantially dead burn said stone and to coat the particles thereof with a ceramically bonded layer high in magnesia.

8. A process as defined in claim 7 in which the bonding agent includes an electrolyte solute dissolved in the slurry.

9. A process as defined in claim 7 in which the bonding agent comprises iron oxides in a proportion amounting to about 1 to 8% of the total charge.

10. A process as defined in claim 7 in which the bonding agent comprises clay in a proportion amounting to about 1 to 8% of the total charge.

11. Coated refractory material comprising particles of mixed sizes, said particles having a core of substantially dead burned dolomite surrounded by a layer of refractory material having substantially greater magnesia content than said core and ceramically bonded thereto.

12. Coated refractory material comprising particles of substantially dead burned dolomite having outer layers of substantially greater magnesia content ceramically bonded to and encasing said particles.

GUSTAV A. HEBBE.
RALPH E. GIBBS.